(12) United States Patent
Anderson et al.

(10) Patent No.: US 6,276,663 B1
(45) Date of Patent: Aug. 21, 2001

(54) NORMALLY RISING VARIABLE FORCE SOLENOID

(75) Inventors: David L. Anderson; Paul A. Christensen, both of Whitehall, MI (US)

(73) Assignee: Acutex, Inc., Whitehall, MI (US)

( * ) Notice: Subject to any disclaimer, the term of this patent is extended or adjusted under 35 U.S.C. 154(b) by 0 days.

(21) Appl. No.: 09/557,546

(22) Filed: Apr. 25, 2000

(51) Int. Cl.$^7$ .................................................. F16K 31/06
(52) U.S. Cl. ................ 251/129.02; 251/129.17; 335/237; 335/279
(58) Field of Search ................ 251/129.02, 129.15, 251/129.17; 335/255, 279, 237

(56) References Cited

U.S. PATENT DOCUMENTS

| | | |
|---|---|---|
| 2,911,183 * | 11/1959 | Matthews et al. ............ 251/129.02 |
| 4,556,085 | 12/1985 | Warrick . |
| 4,570,904 | 2/1986 | Mullally . |
| 4,595,035 | 6/1986 | Warrick . |
| 4,617,961 | 10/1986 | Lichtenberg . |
| 4,617,968 | 10/1986 | Hendrixon . |
| 4,674,536 | 6/1987 | Warrick . |
| 4,753,263 | 6/1988 | Warrick . |
| 4,863,142 | 9/1989 | Hendrixon et al. . |
| 4,932,630 | 6/1990 | Kumar et al. . |
| 4,951,703 | 8/1990 | Brehm et al. . |
| 4,989,564 | 2/1991 | Cook et al. . |
| 5,000,420 | 3/1991 | Hendrixon et al. . |
| 5,000,421 | 3/1991 | Hendrixon et al. . |
| 5,050,840 | 9/1991 | Kondo et al. . |
| 5,051,631 | 9/1991 | Anderson . |
| 5,075,584 | 12/1991 | Hendrixon et al. . |
| 5,076,323 | 12/1991 | Schudt . |
| 5,110,087 * | 5/1992 | Studtmann et al. ........ 251/129.18 X |
| 5,467,962 | 11/1995 | Bircann et al. . |
| 5,593,132 | 1/1997 | Hrytzak . |
| 5,685,519 | 11/1997 | Bircann et al. . |

\* cited by examiner

Primary Examiner—Kevin Lee
(74) Attorney, Agent, or Firm—Haynes and Boone, LLP

(57) ABSTRACT

Method and apparatus are described for a variable force solenoid for controlling the flow of a fluid in a housing having a bore for receiving the fluid flow, at least one port for exhausting the fluid flow, and a seat extending between the port and the bore. The solenoid includes a valve member disposed in the housing. In a closed position, the valve member is engaged with the seat, preventing fluid flow from the bore to the port. In an open position, the valve member is not engaged with the seat, allowing fluid flow from the bore to the port. A subassembly is disposed in the housing and surrounds a portion of the valve member for moving the valve member to its closed position. The subassembly has a movable armature for engaging the valve member, an annular member for attracting the armature, and a gap defined between the armature and the annular member. The gap is maintained by engagement of the armature by the valve member. A coil is disposed in the housing radially outward from the subassembly. Reception of electric current by the coil produces magnetic flux, thereby attracting the armature to the annular member, and thus moving the valve member to the closed position.

26 Claims, 6 Drawing Sheets

NORMALLY RISING VARIABLE FORCE SOLENOID

BACKGROUND

This disclosure relates generally to a solenoid in a hydraulic pressure management system, and more particularly, to a normally rising variable force solenoid interfaced between the electronic logic and hydraulic fluid controls of such a system.

Solenoids have been used to provide hydraulic pressure management in situations where hydraulic output pressure must be independent of hydraulic supply pressure. Output pressure is proportional to the closing force of the solenoid. If the closing force can be varied, the solenoid is said to be a variable force solenoid, and if output pressure increases proportionally with applied closing force, the solenoid is said to be normally rising.

Some previous solenoid designs included springs, either as a closing force or as balance springs in combination with another closing force. However, springs are undesirable for several reasons, for example, decreased performance with wear. Moreover, decreasing the number of components to facilitate manufacture is a major concern in the industry.

One type of closing force used presently is magnetic flux applied to actuate an armature. The magnetic flux is produced by application of an electrical input current to a coil. However, the performance of these solenoids are often negatively impacted by hysteresis, a lagging in the values of resulting magnetization in a magnetic material due to a changing magnetizing force. In practical terms, hysteresis makes the solenoid less responsive to opening or closing commands by resisting movement of the armature. Furthermore, solenoids of this type must be calibrated to provide a predetermined output pressure. In the past, calibration has been a relatively arduous undertaking.

Therefore, what is needed is a normally rising variable force solenoid that is easily calibrated, and has relatively fewer components while minimizing hysteresis.

SUMMARY

Accordingly, an embodiment of the present invention provides a variable force solenoid for controlling the flow of a fluid in a housing having a bore for receiving the fluid flow, at least one port for exhausting the fluid flow, and a seat extending between the port and the bore. The solenoid includes a valve member disposed in the housing. In a closed position, the valve member is engaged with the seat, preventing fluid flow from the bore to the port. In an open position, the valve member is not engaged with the seat, allowing fluid flow from the bore to the port. A subassembly is disposed in the housing and surrounds a portion of the valve member for moving the valve member to its closed position. The subassembly has a movable armature for engaging the valve member, an annular member for attracting the armature, and a gap defined between the armature and the annular member. The gap is maintained by engagement of the armature by the valve member. A coil is disposed in the housing radially outward from the subassembly. Reception of electric current by the coil produces magnetic flux, thereby attracting the armature to the annular member, and thus moving the valve member to the closed position.

One advantage of the embodiments described herein is that hysteresis is minimized by creating a gap between the armature and the annular member. Another advantage of the embodiments is that the subassembly greatly simplifies calibration, as the subassembly is adjusted as a singular component, providing more consistent and accurate output pressure. Yet another advantage is that fewer components are used when compared to previous designs.

DETAILED DESCRIPTION

Figure 1:
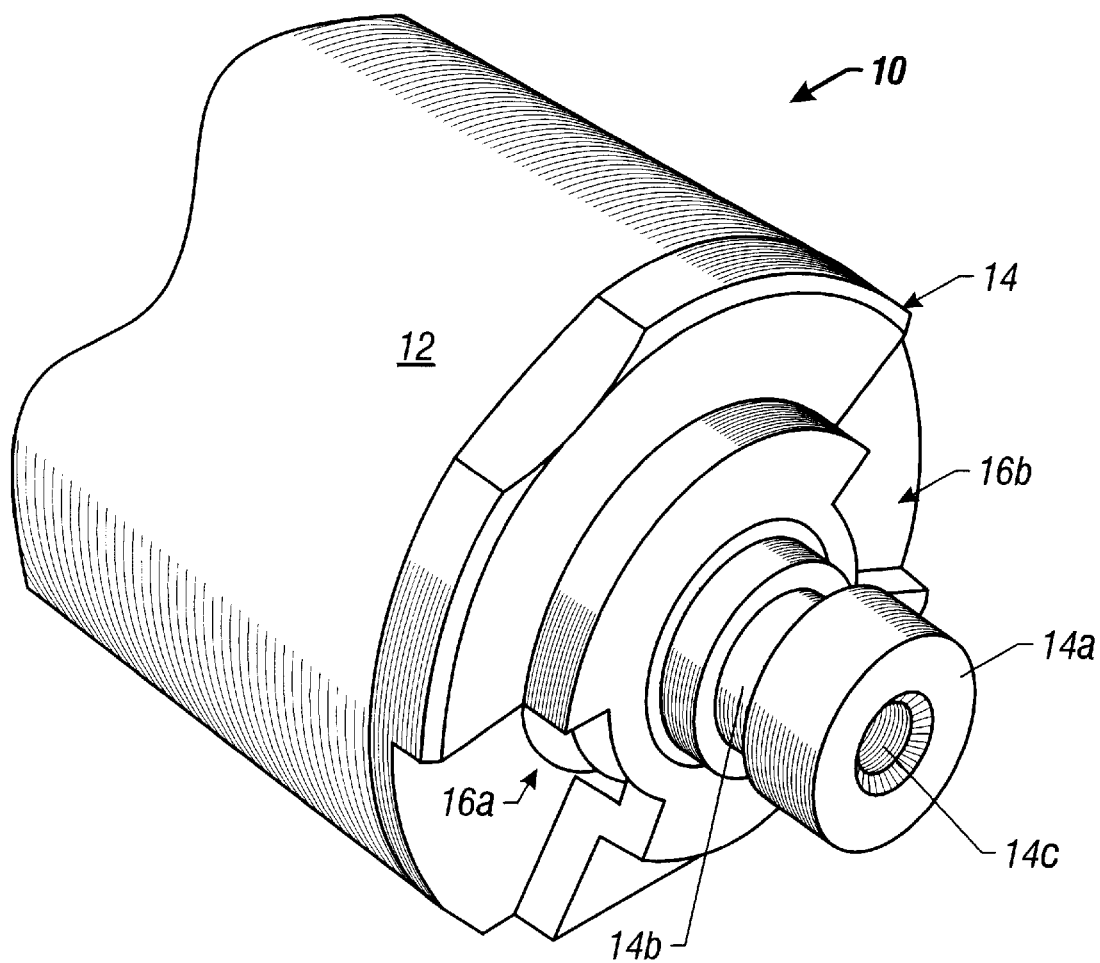
FIG. 1 is an isometric view of a normally rising variable force solenoid according to an embodiment of the present invention.

Referring to FIG. 1, the reference numeral 10 refers to a normally rising, multi-port, variable force solenoid. The solenoid 10 has a cylindrical housing 12, and a snout 14 attached to the housing, for example, by a press fit. The snout 14 has a reduced diameter end portion 14a, which protrudes from the housing 12, and which has an external groove 14b for facilitating attachment to a hydraulic fluid supply by accepting an o-ring (not depicted) for sealing fluid pressure. The end portion 14a also has an axial bore 14c which is in fluid communication with an interior portion of the housing 12 and two ports, 16a and 16b.

Figure 2:
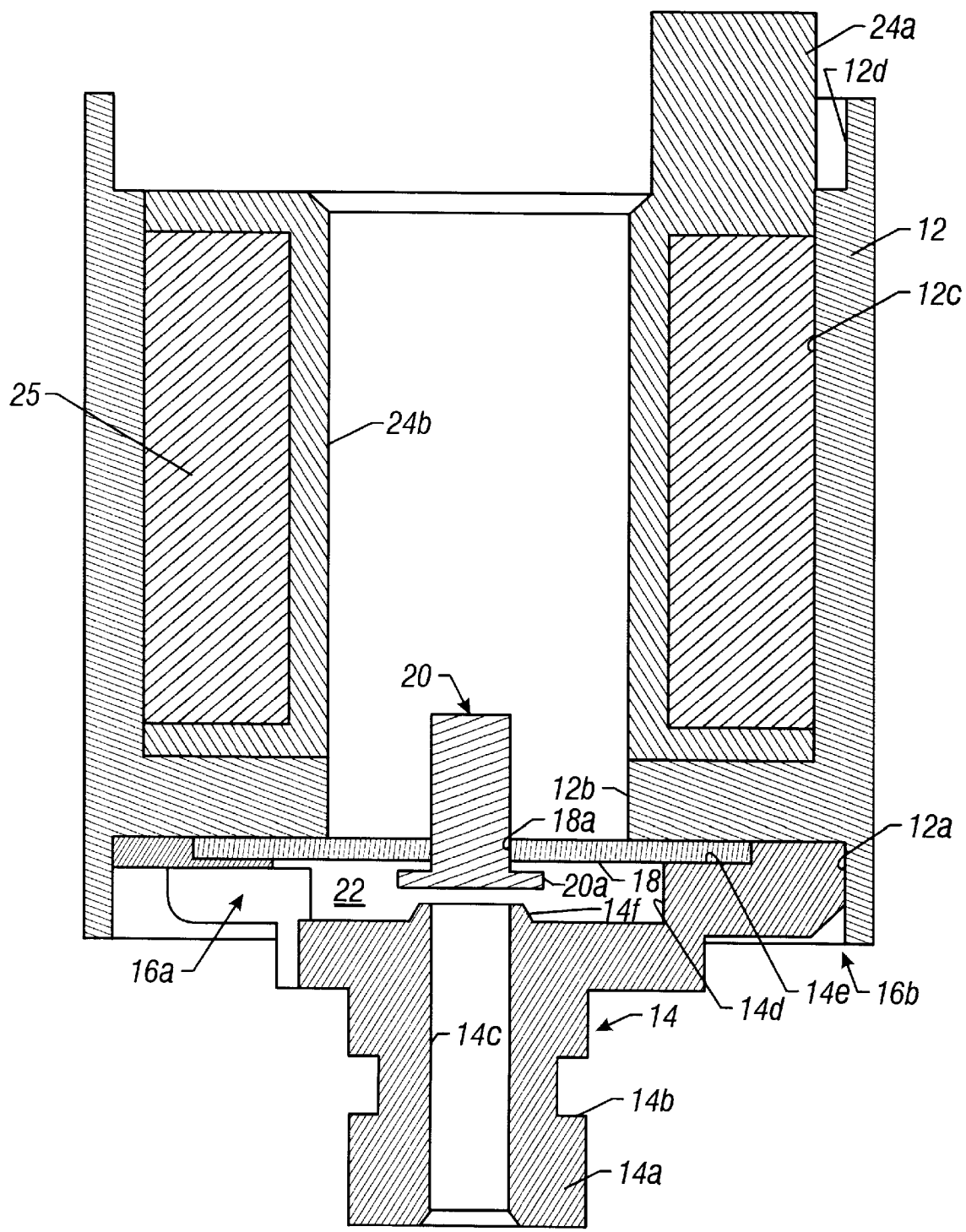
FIG. 2 is a cross-sectional view of the solenoid of FIG. 1 with a subassembly removed.

Referring to FIG. 2, the housing 12 has a stepped axial bore which divides the interior of the housing into four sections: 12a, 12b, 12c, and 12d.

The snout 14 is substantially "Y" shaped in cross section, and is attached to the housing section 12a. A stepped axial bore divides the interior of the snout 14 into three sections: 14c, 14d, and 14e. A protruding interior seat 14f is provided at the interior end of the section 14c.

The snout section 14e receives a diaphragm 18, which is biased between the snout and the radial wall defining the housing section 12a, to form a contaminant barrier. An opening 18a extends through the center of the diaphragm 18, and a pin 20 is slidably mounted in the opening to allow axial movement by the pin. The diaphragm 18 forms a fluid tight seal around the pin 20 to prevent fluid from reaching the housing sections 12b, 12c, and 12d. Thus, the diaphragm 18 and snout section 14d define a fluid chamber 22 which is disposed between, and in communication with, the snout section 14c and the ports 16a and 16b.

In an open position of the pin 20, as illustrated, a flanged end portion 20a of the pin is spaced away from the snout seat 14f. In a closed position of the pin 20, the flanged end portion 20a is engaged with the snout seat 14f.

Figure 3:
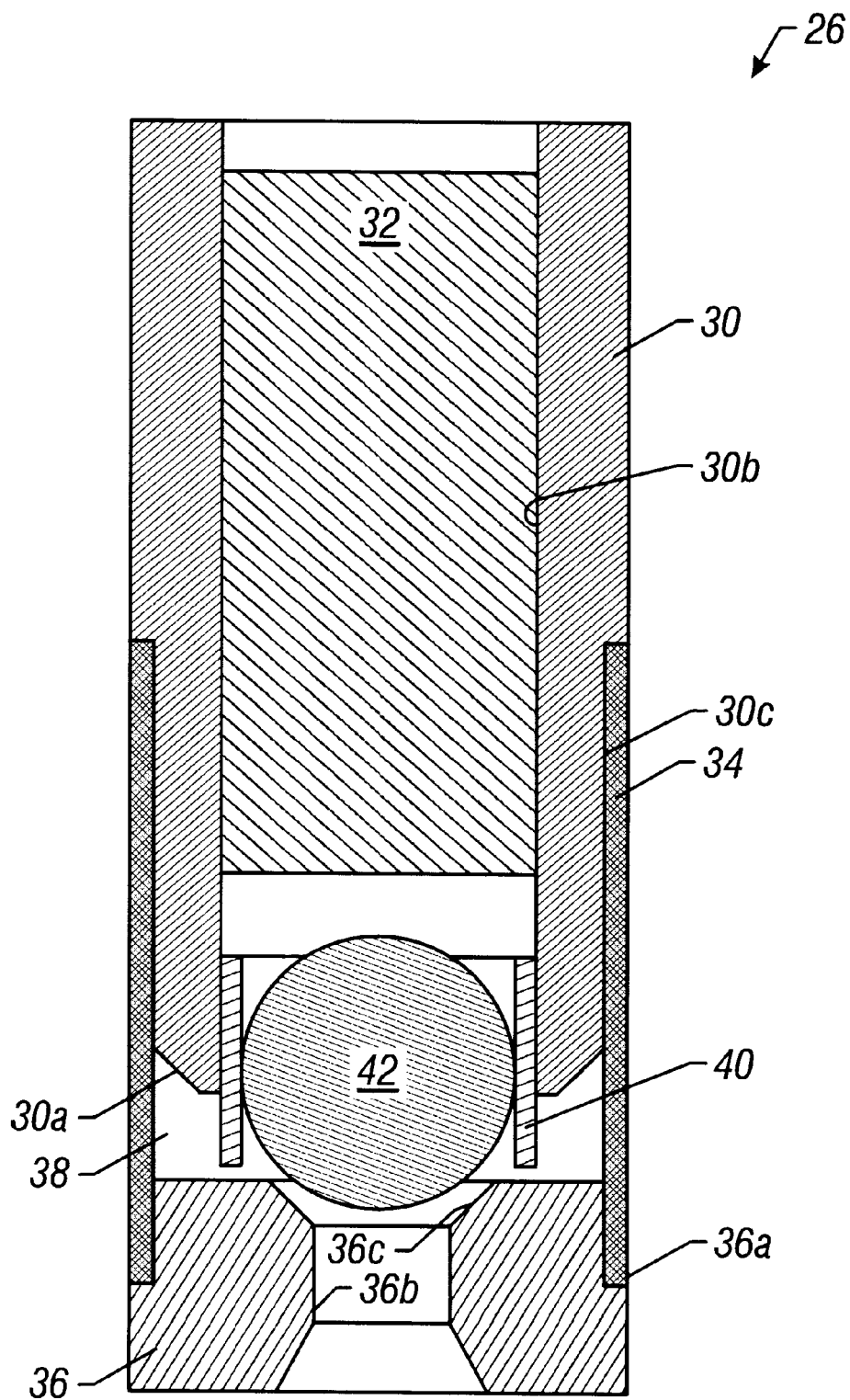
FIG. 3 is a cross-sectional view of the subassembly of the solenoid of FIG. 1.

A nonmagnetic coil housing 24 is disposed in the housing sections 12c and 12d with a portion 24a of the coil housing protruding from the rear of the housing 12 to attach to an external power supply. A cylindrical wire coil 25 is wrapped around an outer portion of the housing 24. A bore 24b is formed through the housing 24 for receiving a subassembly, generally referred to by the reference numeral 26 in FIG. 3.

The subassembly 26 is designed to be pressed into the bore 24b of the housing 24, with the end of the subassembly engaging housing section 12b in a tight fit. Thus, the subassembly 26 is disposed radially inwardly relative to the coil housing 24. The subassembly 26 includes a cylindrical centerpole 30 having an externally tapered end 30a. A bore 30b is formed in the centerpole 30, and receives a plug 32. An external stepped-in portion 30c is formed on the centerpole 30 adjacent to the tapered end 30a for receiving a connection sleeve 34, which extends beyond the centerpole tapered end to engage a ring 36, thereby connecting the centerpole to the ring.

The ring 36 has an external stepped-in portion 36a for receiving the connection sleeve 34, such that the exterior surface of the ring is flush with the exterior surface of the connection sleeve to facilitate insertion of the subassembly 26 into the bore 24b of the housing 24. The ring 36 defines an axial bore 36b, one end of which is tapered outwardly, to receive the pin 20 (FIG. 2) in a manner which allows the pin to slide between its above-described open and closed positions. A distal portion of the axial bore 36b is also tapered to define a seat 36c. Opposing surfaces of the centerpole 30, the connection sleeve 34, and the ring 36 define an armature chamber 38.

A nonmagnetic inner sleeve 40 is disposed in the centerpole bore 30b, and extends into the chamber 38 for receiving a magnetically susceptible armature ball 42 in an axially sliding fit, with the sleeve 40 isolating the ball from lateral magnetic flux carried through the centerpole 30. The ball 42 is kept in the chamber 38 by the plug 32 and the ring 36. The shape of the ball 42 minimizes its lateral surface area, and therefore reduces possible lateral friction with the sleeve 40.

Figure 4:
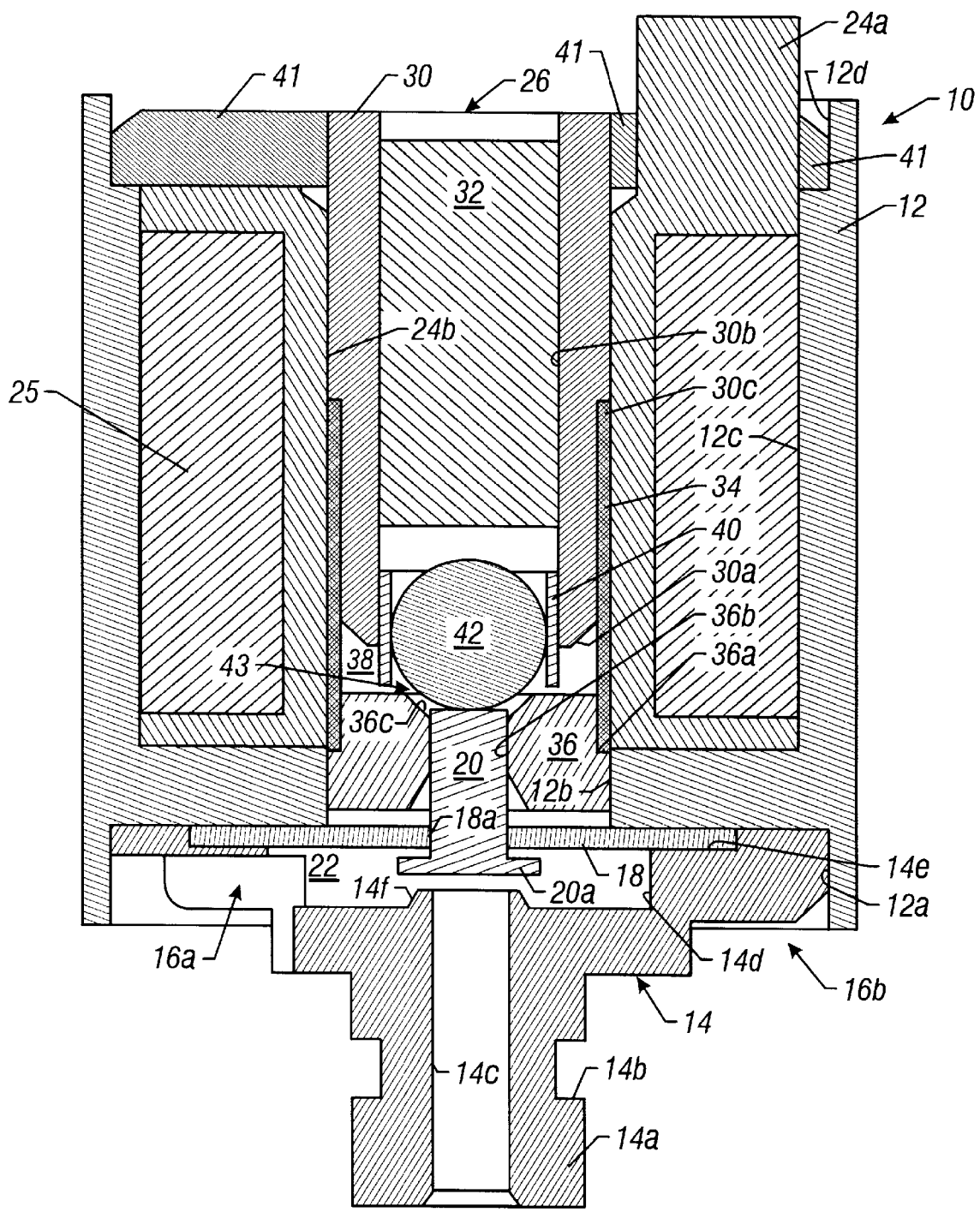
FIG. 4 is a cross-sectional view of the solenoid of FIG. 1.

Referring to FIG. 4, the solenoid 10 is depicted after the subassembly 26 has been inserted into the bore 24b of the housing 24. A washer 41 engages the housing section 12d and the coil housing 24, holding the subassembly 26 in place. The ball 42 contacts and moves with the pin 20 between the pin's open and closed positions. The ball 42 is held away from the seat 36c by the pin 20, forming a gap 43, in a manner to be explained. It is understood that the thickness of the gap 43 is exaggerated for the purposes of illustration.

Figure 5:
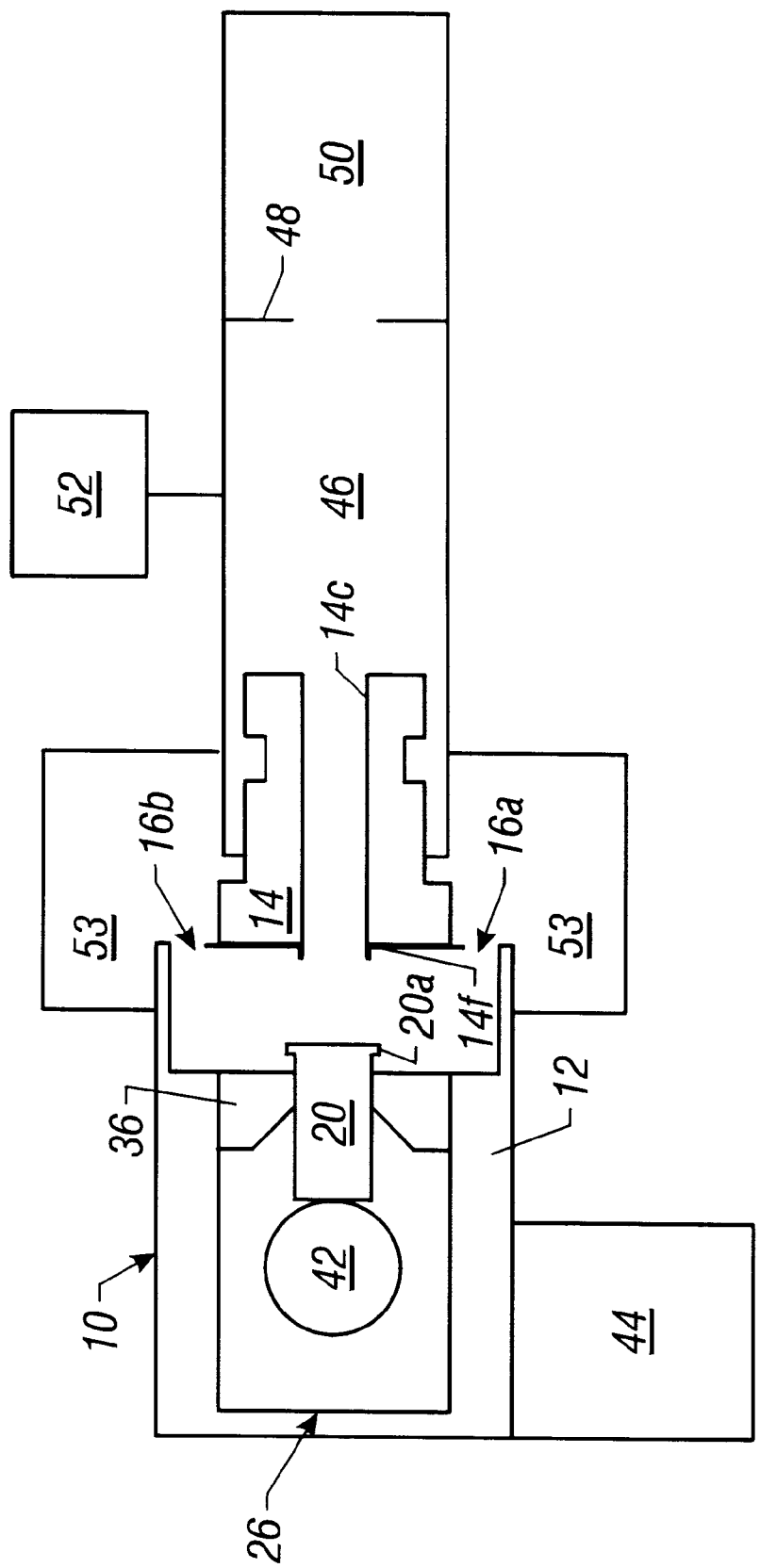
FIG. 5 is a schematic diagram of the solenoid of FIG. 1 in the open position.

FIG. 5 depicts the solenoid 10 connected to a current input device 44, which is operably connected to the solenoid for providing an electrical current to the coil 25 (FIG. 4) of the solenoid. A hydraulic control chamber 46 is formed between the solenoid 10 and an orifice 48 which connects the control chamber 46 to a hydraulic supply chamber 50. The fluid pressure in the control chamber 46 is monitored by a pressure sensing device 52. Hydraulic fluid (not shown) is supplied from the hydraulic supply chamber 50, and flows through the orifice 48, which acts as a flow restrictor so that fluid flowing into the control chamber 46 from the supply chamber 50 is impeded, whereas flow into the section 14c, and, if the pin 20 is in its open position, out the ports 16a and 16b is relatively unimpeded. If used in an automatic transmission system, the ports 16a and 16b are connected to an exhaust reservoir 53.

In operation, referring to FIG. 4, if no electrical current is supplied to the coil housing 24 from the current input device 44 (FIG. 5), hydraulic fluid flows through the bore 14c of the snout 14, and contacts the pin 20. The resulting hydraulic opening force keeps the pin 20 in its open position, away from the snout seat 14f. The fluid thus flows virtually unimpeded into the chamber 22, out the ports 16a and 16b, and to the exhaust reservoir 53 (FIG. 5). Thus, as inflow from the supply chamber 50 (FIG. 5) into the chamber 46 (FIG. 5) is impeded by the orifice 48 (FIG. 5), and outflow from the chamber 46 (FIG. 5) is relatively unimpeded, the hydraulic pressure in the control chamber 46 (FIG. 5), which is monitored to indicate the output pressure, is essentially zero.

To close the solenoid 10, electrical current is supplied from the input current device 44 (FIG. 5), and as a result, the coil 25 develops a magnetic flux. The centerpole 30 and ring 36 have shapes which enhance and focus the magnetic flux, which travels in a circular pattern, for example through the housing 12, into the washer 41, to the centerpole 30, into the ball 42, and across the gap 43 to the ring 36, such that the ball is attracted to the ring, providing a magnetic closing force for the pin 20, as will be explained. The flux path then returns to the housing 12 via the ring 36 and begins the cycle again.

Thus, as current levels are increased, magnetic flux levels increase, and the attraction between the ring 36 and the ball 42 grows stronger. Since the ball 42 is in contact with the pin 20, the ball does not move towards the ring 36 until the magnetic closing force is greater than the counteracting hydraulic opening force acting on the pin. During this operation, the inner sleeve 40 isolates the ball 42 from lateral pull from the magnetic flux field, and subsequent undesirable frictional effects.

Once an electrical force sufficient to produce a net magnetic closing force is provided, the ball 42 moves toward the ring 36, and therefore the pin 20 is moved toward the snout seat 14f, i.e., downwards as viewed in FIG. 4, towards its closed position. The pin 20 thereby restricts hydraulic flow between the snout section 14c and the ports 16a and 16b, thus causing a corresponding increase in the output pressure. As this output pressure increases, it results in an increase of the hydraulic opening force acting on the pin 20, thereby requiring a greater threshold magnetic closing force to continue movement of the ball 42 and, therefore, the pin. If a sufficient level of electrical current is present, or is supplied, the ball 42 continues to urge the pin 20 towards the snout seat 14f until the pin reaches its closed position in which it contacts the snout seat, thus preventing flow of the hydraulic fluid. Pressure in the control chamber 46 (FIG. 5) is at its peak when the pin 20 is in this closed position, and is equal to the supply pressure from the supply chamber 50 (FIG. 5).

When the electrical current is decreased, the hydraulic opening force forces the pin 20, and therefore the ball 42, away from the snout seat 14f, until the magnetic closing force and opposing hydraulic opening force are in equilibrium, whereupon the pin takes an equilibrium position, and produces a corresponding output pressure. Thus, by applying different electrical current levels, the solenoid 10 may be operated along a continuum of positions of the pin 20 and associated output pressures ranging between the fully closed position, where output pressure is equal to the supply pressure, and the fully open position, where the pin is pushed as far back as possible by the hydraulic opening force, and the output pressure is essentially zero.

Calibration, at a given electrical current level, involves balancing the magnetic closing force against the hydraulic opening force acting on the pin 20 to produce a predetermined output pressure. To calibrate the solenoid 10, an electrical current level sufficient to fully engage the ball 42 with the seat 36c is applied, as is a predetermined fluid supply pressure, while axially inserting the subassembly 26 into the housing 12. As the subassembly 26 is inserted, in a downward direction in FIG. 4, the ball 42 engages and moves the pin 20, causing the pin to move toward the snout seat 14f, thereby restricting hydraulic fluid flow between the snout section 14c and the ports 16a and 16b. This restriction creates a measurable rise in the output pressure, as monitored by the pressure in the control chamber 46 (FIG. 5).

A peak control pressure in the chamber 46 (FIG. 5) is attained while the ball 42 is still fully engaged with the seat 36c, and the pin 20 is in contact with the snout seat 14f, preventing fluid flow between the snout section 14c and the ports 16a and 16b. After the control pressure in the chamber 46 (FIG. 5) reaches a peak, continued axial insertion of the subassembly 26 will cause the pin 20, which can advance no further because of the snout seat 14f, to push the ball 42 away from the seat 36c, creating the gap 43 between the ball and the seat, as shown in FIG. 4.

The gap 43 reduces the magnetic closing force between the ball 42 and the ring 36, which produces a lower output pressure. Thus, after the gap 43 is formed, more electrical current will be required to produce the same magnetic closing force. However, the gap 43 is beneficial, as it allows the solenoid 10 to avoid gross hysteresis both initially and as normal wear occurs. The gap 43 not only prevents metal to metal contact in the magnetic circuit, it compensates for some wear on the pin end 20a and snout seat 14f, before the consequent lengthening of the distance the pin 20 travels causes the ball 42 to "bottom out" on the seat 36c. Repair is necessary once the ball 42 starts to bottom out as a result of such wear, as the ball can provide no further closing force on the pin 20 when bottomed out, and thus the pin 20 will not tightly engage the seat 14f.

Returning to calibration, the subassembly 26 is further inserted until a predetermined output pressure is produced for the given electrical input current. In practice, the size of the gap 43 produced to obtain this predetermined output pressure may vary slightly between solenoids of the present embodiment, as a result of minor dimensional differences resulting from manufacture. However, once calibrated by the above-described method, all such solenoids will produce the predetermined output pressure at the given current level, with consistency and accuracy.

One advantage of this embodiment is that it minimizes hysteresis with its friction reducing inner sleeve and gap. Another advantage of this embodiment is that the subassembly greatly simplifies calibration, as the subassembly is adjusted as a singular component, providing more consistent and accurate output pressure. Yet another advantage is that the embodiment uses fewer components than previous designs.

Figure 6:
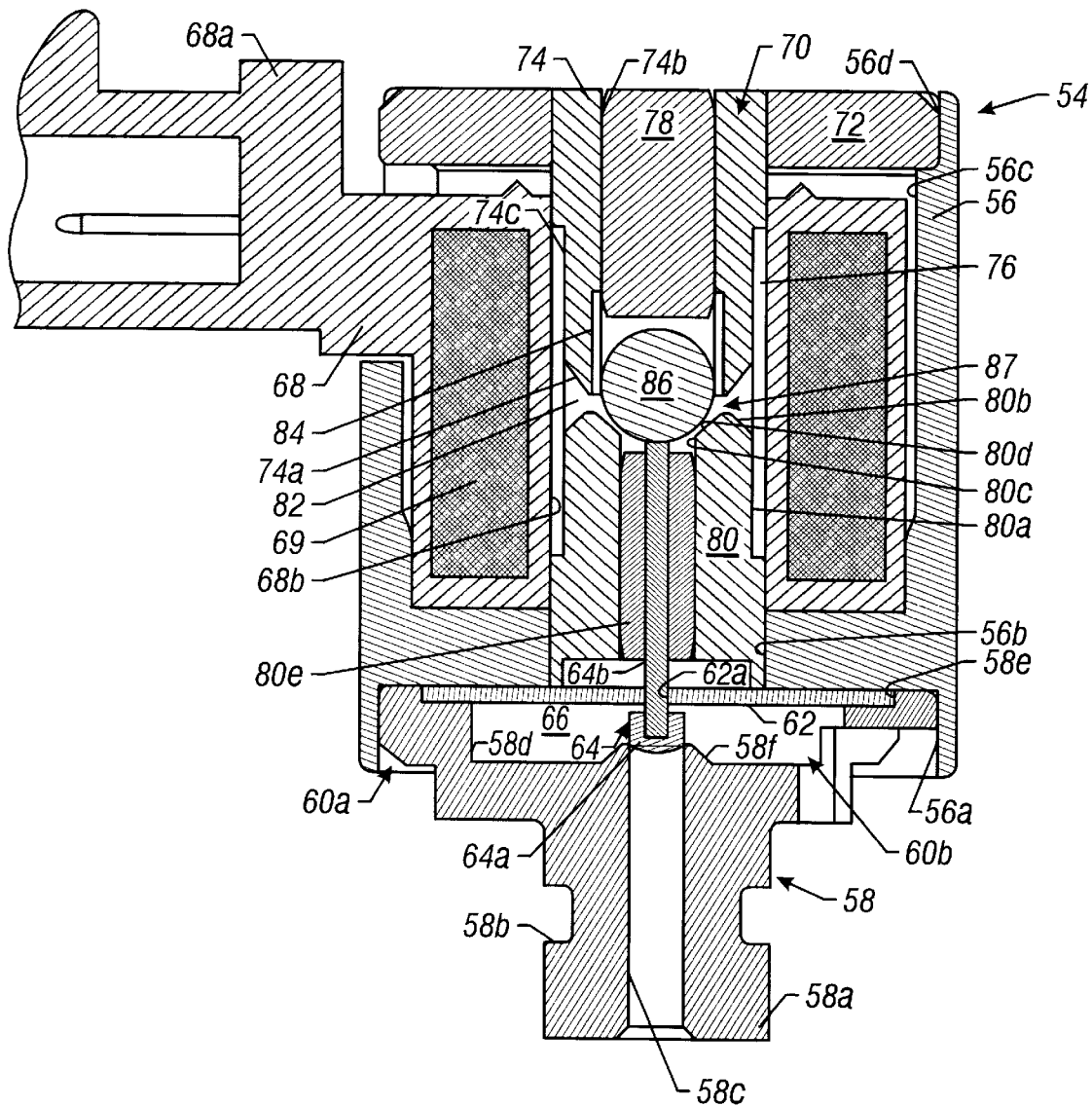
FIG. 6 is a cross-sectional view of another embodiment of the present invention.

Referring to FIG. 6, the reference numeral 54 refers to an alternative embodiment of a normally rising, multi-port, variable force solenoid. It is understood that the embodiment of FIG. 6 is connected to the same fluid controls as shown in FIG. 5.

The solenoid 54 has a cylindrical housing 56, which has a stepped axial bore that divides the interior of the housing into four sections: 56a, 56b, 56c, and 56d. A substantially "Y" shaped snout 58 is attached to the housing section 56a. The snout 58 has a reduced diameter end portion 58a, which protrudes from the housing 56, and which has an external groove 58b for facilitating attachment to a hydraulic fluid supply by accepting an o-ring (not depicted) for sealing fluid pressure. A stepped axial bore divides the interior of the snout 58 into three sections: 58c, 58d, and 58e. The snout section 58c is in fluid communication with two ports, 60a and 60b. A protruding interior seat 58f is provided at the interior end of the snout section 58c.

A diaphragm 62 is disposed in the snout section 58e, and is biased between the snout 58 and the radial wall defining the housing section 56a, to form a contaminant barrier. An opening 62a extends through the center of the diaphragm 62, and a pin 64 is slidably mounted in the opening. The diaphragm 62 forms a fluid tight seal around the pin 64 to prevent fluid from reaching the housing sections 56b, 56c, and 56d, and thus, the diaphragm and snout section 58d define a fluid chamber 66 which is disposed between, and in communication with, the snout section 58c and the ports 60a and 60b.

The pin 64 has a pin cap 64a and a pin shaft 64b. In a open position of the pin 64, the pin cap 64a is spaced away from the snout seat 58f. In a closed position, as shown in FIG. 6, the pin cap 64a is engaged with the snout seat 58f.

A nonmagnetic coil housing 68 is disposed in the housing section 56c with a portion 68a of the coil housing protruding from the side of the housing 56 to attach to an external power supply. A cylindrical wire coil 69 is wrapped around an outer portion of the housing 68. A bore 68b is formed through the housing 68 for receiving a subassembly, generally referred to by the reference numeral 70.

The subassembly 70 is designed to be pressed into the bore 68b of the housing 68, with the end of the subassembly engaging housing section 56b in a tight fit. Thus, the subassembly 70 is disposed radially inwardly relative to the coil housing 68. An annular spacer 72 engages the housing section 56d and the subassembly 70, holding the subassembly in place.

The subassembly 70 includes a cylindrical centerpole 74 having an externally tapered end 74a. A bore 74b is formed in the centerpole 74, and receives a plug 78. An external stepped-in portion 74c is formed on the centerpole 74 adjacent to the tapered end 74a for receiving a connection sleeve 76, which connects the centerpole to a cylinder 80 in a spaced relationship.

An external portion 80a of the cylinder 80 is stepped-in to receive the connection sleeve 76, such that the exterior surface of the cylinder is flush with the exterior surface of the connection sleeve to facilitate insertion of the subassembly 70 into the bore 68b of the housing 68. The cylinder 80 also has a tapered external end 80b, and defines an axial bore 80c. A distal portion of the axial bore 80c is tapered to define a seat 80d. A pin support cylinder 80e is disposed in the axial bore 80c for receiving the pin shaft 64b in a manner which allows the pin 64 to slide between its open and closed positions. Opposing surfaces of the centerpole 74, the connection sleeve 76, and the cylinder 80 define an armature chamber 82.

A nonmagnetic inner sleeve 84 is disposed in the centerpole bore 74b, and extends into the chamber 82 for receiving a magnetically susceptible armature ball 86 in an axially sliding fit, with the sleeve 84 isolating the ball from lateral magnetic flux carried through the centerpole 74. The ball 86 is kept from exiting the rear of the centerpole bore 74b by the plug 78. The shape of the ball 86 minimizes its lateral surface area, and therefore reduces possible lateral friction with the sleeve 84.

The ball 86 contacts and moves with the pin 64 between the pin's above-described open and closed positions. The ball 86 is held away from the seat 80d by the pin 64, forming a gap 87, in a manner to be explained. It is understood that the thickness of the gap 87 is exaggerated for the purposes of illustration.

In operation, if no electrical current is supplied to the coil housing 68 from the current input device 44 (FIG. 5), hydraulic fluid flows through the snout bore 58c, and the resulting hydraulic opening force pushes the pin 64 away from the snout seat 58f. The fluid thus flows into the chamber 66, out the ports 60a and 60b, and to the exhaust reservoir 53 (FIG. 5). In this fully open position of the pin, output pressure is essentially equal to zero.

To close the solenoid 54, electrical current is supplied from the input current device 44 (FIG. 5), and as a result, the coil 69 develops a magnetic flux. The centerpole 74 and the cylinder 80 have shapes which enhance and focus the magnetic flux, which travels in a circular pattern, for example through the housing 56, into the washer 72, to the centerpole 74, into the ball 86, and across the gap 87 to the cylinder 80, such that the ball is attracted to the ring, providing a magnetic closing force for the pin 64, as will be explained. The flux path then returns to the housing 56 via the cylinder 80 and begins the cycle again.

As current levels are increased, magnetic flux levels increase, and the attraction between the cylinder 80 and the ball 86 grows stronger. Since the ball 86 is in contact with the pin 64, the ball does not move towards the cylinder 80 until the magnetic closing force is greater than the counteracting hydraulic opening force acting on the pin. During operation, the inner sleeve 84 isolates the ball 86 from lateral pull from the magnetic flux field, and subsequent undesirable frictional effects.

Once an electrical force sufficient to produce a net magnetic closing force is provided, the ball 86 moves toward the cylinder 80, and therefore the pin 64 is moved toward the snout seat 58f. The pin 64 thereby restricts hydraulic flow between the snout section 58c and the ports 60a and 60b, thus causing a corresponding increase in the output pressure. As this output pressure increases, it results in an increase of the hydraulic opening force acting on the pin 64, thereby requiring a greater threshold magnetic closing force to continue movement of the ball 86 and, therefore, the pin. If a sufficient level of electrical current is present, or is supplied, the ball 86 continues to urge the pin 64 towards the snout seat 58f until the pin reaches its closed position in which it contacts the snout seat, as shown in FIG. 6, thus preventing flow of the hydraulic fluid. Control chamber pressure is at its peak when the pin 64 is in this closed position, and is equal to the supply pressure from the supply chamber 50 (FIG. 5).

When the electrical current is decreased, the hydraulic opening force forces the pin 64, and therefore the ball 86, away from the snout seat 58f, until the magnetic closing force and opposing hydraulic opening force are in equilibrium, whereupon the pin takes an equilibrium position, and produces a corresponding output pressure. Thus, by applying different electrical current levels, the solenoid 54 may be operated along a continuum of positions of the pin 64 and associated output pressures ranging between the fully closed position, where output pressure is equal to the supply pressure, and the fully open position, where the pin is pushed as far back as possible by the hydraulic opening force, and the output pressure is equal to zero.

Calibration, at a given electrical current level, involves balancing the magnetic closing force against the hydraulic opening force acting on the pin 64 to produce a predetermined output pressure. To calibrate the solenoid 54, an electrical current level sufficient to fully engage the ball 86 with the seat 80d is applied, as is a predetermined fluid supply pressure, while axially inserting the subassembly 70 into the housing 56. As the subassembly 70 is inserted, in a downward direction in FIG. 6, the ball 86 engages and moves the pin 64, causing the pin to move toward the snout seat 58f, thereby restricting hydraulic fluid flow between the snout section 58c and the chamber 66 and the ports 60a and 60b. This restriction creates a measurable rise in the output pressure, as monitored by the pressure in the control chamber 46 (FIG. 5).

A peak control pressure in the chamber 46 (FIG. 5) is attained while the ball 86 is still fully engaged with the seat 80d, and the pin 64 is in contact with the snout seat 58f, preventing fluid flow between the snout section 58c and the ports 60a and 60b. After the control pressure reaches a peak, continued axial insertion of the subassembly 70 will cause the pin 64, which can advance no further because of the snout seat 58f, to push the ball 86 away from the seat 80d, creating the gap 87 between the ball and the seat, as shown in FIG. 6.

The gap 87 reduces the magnetic closing force between the ball 86 and the cylinder 80, which produces a lower output pressure. Thus, after the gap 87 is formed, more electrical current will be required to produce the same magnetic closing force. However, the gap 87 is beneficial, as it allows the solenoid 54 to avoid gross hysteresis both initially and as normal wear occurs. The gap 87 not only prevents metal to metal contact in the magnetic circuit, it compensates for some wear on the pin end 64a and snout seat 58f before the consequent lengthening of the distance the pin 64 travels causes the ball 87 to bottom out on the seat 80d, requiring repair.

Returning to calibration, the subassembly 70 is further inserted until a predetermined output pressure is produced for the given electrical input current. In practice, the size of the gap 87 produced to obtain this predetermined output pressure may vary slightly between solenoids of the present embodiment, as a result of minor dimensional differences resulting from manufacture. However, once calibrated by the above-described method, all such solenoids will produce the predetermined output pressure at the given current level, with consistency and accuracy.

One advantage of this embodiment is that it minimizes hysteresis with its friction reducing inner sleeve and gap. Another advantage of this embodiment is that the subassembly greatly simplifies calibration, as the subassembly is adjusted as a singular component, providing more consistent and accurate output pressure. Yet another advantage is that the embodiment uses fewer components than previous designs.

It is understood that all spatial references, such as front and rear, are only for the purposes of explanation of the drawings. This disclosure shows and describes illustrative embodiments, however, the disclosure contemplates a wide range of modifications, changes, and substitutions. Such variations may employ only some features of the embodiments without departing from the scope of the underlying invention. For example, two ports are shown, but the present invention embodies achieving the proper exhaust area, and thus encompasses using both more and fewer ports. Accordingly, any appropriate construction of the appended claims will reflect the broad scope of the underlying invention.

What is claimed is:

1. A system for controlling the flow of a fluid, comprising:
   a housing having a bore for receiving the fluid flow, at least one port for exhausting the fluid flow, and a seat extending between the port and the bore;
   a valve member disposed in the housing, wherein in a closed position the valve member is engaged with the seat, preventing fluid flow from the bore to the port, and in an open position the valve member is not engaged with the seat, allowing fluid flow from the bore to the port;

a movable armature disposed in the housing for engaging and moving the valve member to its closed position;

an annular member surrounding a portion of the valve member;

means for selectively producing a magnetic flux for attracting the armature to the annular member, thereby moving the valve member toward the closed position; and a gap defined between the armature and the annular member, wherein the gap is maintained by engagement of the armature by the valve member.

2. The system of claim 1 wherein the means for selectively producing a magnetic flux is a coil disposed in the housing radially outward from the armature, and wherein reception of electric current by the coil produces magnetic flux, thereby attracting the armature to the annular member.

3. The system of claim 1 wherein the armature is a ball for reducing lateral friction.

4. The system of claim 1 further comprising a diaphragm disposed in the housing for preventing fluid contamination between first and second portions of the housing.

5. The system of claim 1 wherein the bore, the seat, and the port are defined by a snout attached to the housing.

6. The system of claim 1 wherein the annular member is tapered to transfer magnetic flux more efficiently.

7. The system of claim 1 further comprising a centerpole surrounding the armature, the centerpole being connected to the annular member by a connection sleeve.

8. The system of claim 7 wherein the centerpole is tapered to transfer magnetic flux more efficiently.

9. The system of claim 7 wherein a nonmagnetic sleeve is interposed between the centerpole and the armature for isolating the armature from lateral magnetic flux from the centerpole.

10. A variable force solenoid for controlling the flow of a fluid in a housing having a bore for receiving the fluid flow, at least one port for exhausting the fluid flow, and a seat extending between the port and the bore, the solenoid comprising:

a valve member disposed in the housing, wherein in a closed position the valve member is engaged with the seat, preventing fluid flow from the bore to the port, and in an open position the valve member is not engaged with the seat, allowing fluid flow from the bore to the port;

a subassembly disposed in the housing and surrounding a portion of the valve member for moving the valve member to its closed position, the subassembly comprising:

(i) a movable armature for engaging the valve member;
(ii) an annular member for attracting the armature; and
(iii) a gap defined between the armature and the annular member, wherein the gap is maintained by engagement of the armature by the valve member; and a coil disposed in the housing radially outward from the subassembly, wherein reception of electric current by the coil produces magnetic flux, thereby attracting the armature to the annular member, and thus moving the valve member to the closed position.

11. The system of claim 10 wherein the armature is a ball for reducing lateral friction.

12. The system of claim 10 further comprising a diaphragm disposed in the housing for preventing fluid contamination between first and second portions of the housing.

13. The system of claim 10 wherein the bore, the seat, and the port are defined by a snout attached to the housing.

14. The system of claim 10 wherein the annular member is tapered to transfer magnetic flux more efficiently.

15. The system of claim 10 wherein the subassembly further comprises a centerpole surrounding the armature, the centerpole being connected to the annular member by a connection sleeve.

16. The system of claim 15 wherein the centerpole is tapered to transfer magnetic flux more efficiently.

17. The system of claim 15 wherein a nonmagnetic sleeve is interposed between the centerpole and the armature for isolating the armature from lateral magnetic flux from the centerpole.

18. A variable force solenoid for controlling the flow of a fluid in a housing having a bore for receiving the fluid flow, at least one port for exhausting the fluid flow, and a seat extending between the port and the bore, the solenoid comprising:

a coil, wherein reception of electric current by the coil produces magnetic flux;

an annular member disposed radially inward relative to the coil for receiving the magnetic flux;

an armature disposed adjacent to the annular member, wherein the armature is attracted to, and moves toward, the annular member when magnetic flux is applied; and a valve member engaged with the armature, and extending through the annular member and into the housing, such that a gap is defined between the armature and the annular member, the gap being maintained by engagement of the armature by the valve member;

wherein the valve member is moveable between a closed position in which the valve member is engaged with the seat, preventing fluid flow from the bore to the port, and an equilibrium position in which the valve member is not engaged with the seat, allowing fluid flow from the bore to the port, wherein the equilibrium position taken by the valve member is the result of a magnetic closing force produced by the armature forcing the valve member toward the seat counteracted by a superior hydraulic opening force associated with the fluid flow, which forces the valve member away from the seat.

19. The variable force solenoid of claim 18 further comprising a centerpole surrounding the armature, the centerpole being connected to the annular member by a connection sleeve.

20. The variable force solenoid of claim 19 wherein the centerpole is tapered to transfer magnetic flux more efficiently.

21. The variable force solenoid of claim 19 wherein a nonmagnetic sleeve is interposed between the centerpole and the armature for isolating the armature from lateral magnetic flux from the centerpole.

22. The variable force solenoid of claim 18 wherein the armature is a ball for reducing lateral friction.

23. The variable force solenoid of claim 18 further comprising a diaphragm disposed in the housing for preventing fluid contamination between first and second portions of the housing.

24. The variable force solenoid of claim 18 wherein the bore, the seat, and the port are defined by a snout attached to the housing.

25. The variable force solenoid of claim 18 wherein the annular member is tapered to transfer magnetic flux more efficiently.

26. A method for calibrating a variable force solenoid having an armature for controlling the flow of a fluid, comprising the steps of:

disposing the armature and a corresponding seat in a subassembly;

actuating the armature at a predetermined electrical current level, such that the armature is fully engaged with the seat;

applying a predetermined fluid pressure to the solenoid;

monitoring the output fluid pressure flow from the solenoid;

axially inserting the subassembly into the solenoid, thereby restricting fluid flow until a peak output fluid pressure is produced; and further inserting the subassembly to produce a predetermined output fluid pressure and to create a gap between the armature and the annular member.

* * * * *